(12) United States Patent
Merlet et al.

(10) Patent No.: US 7,650,054 B2
(45) Date of Patent: Jan. 19, 2010

(54) VERY HIGH QUALITY CHANNEL FOR MULTIPATHWAY OPTICAL ROTARY JOINTS

(75) Inventors: Thomas Merlet, Dourdan (FR); Morgan Queguiner, Saint Cyr Sous Dourdan (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/277,080

(22) Filed: Nov. 24, 2008

(65) Prior Publication Data
US 2009/0142017 A1    Jun. 4, 2009

(30) Foreign Application Priority Data
Nov. 23, 2007  (FR) .................................. 07 08212

(51) Int. Cl.
*G02B 6/26* (2006.01)
(52) U.S. Cl. ....................................................... 385/26
(58) Field of Classification Search ........................ None
See application file for complete search history.

(56) References Cited

U.S. PATENT DOCUMENTS

| | | | |
|---|---|---|---|
| 4,872,737 A * | 10/1989 | Fukahori et al. | 385/25 |
| 2005/0036735 A1 | 2/2005 | Oosterhuis et al. | |
| 2008/0069495 A1 * | 3/2008 | Hirohashi et al. | 385/25 |

FOREIGN PATENT DOCUMENTS

| DE | 102005056899 A1 | 5/2007 |
|---|---|---|
| GB | 2163617 A * | 2/1986 |
| JP | 3-31807 A * | 2/1991 |

OTHER PUBLICATIONS

Jing, et al. "Design and implementation of a broadband optical rotary joint using C-lenses" Optics Express vol. 12, No. 17, Aug. 23, 2004., pp. 4088-4093.
Dagong Jia, et al. Effect of misalignment on rotation coupling efficiency of the Proceedings of the Spie vol. 6829, Nov. 12, 2007, pp. 68290S-11-68290S-9.

* cited by examiner

*Primary Examiner*—Mike Stahl
(74) *Attorney, Agent, or Firm*—Darby & Darby

(57) ABSTRACT

The present invention relates to the field of rotary joints, or similar devices, more specifically to optical rotary joints. Embodiments of the invention are directed to a multipathway optical rotary joint, comprising a stationary plane, a moving plane rotatable about a reference axis of rotation and a Dove prism, rotatably placed between the stationary plane and the moving plane. The assembly is configured so that when the moving plane rotates at a speed ω, the prism rotates at a speed ω/2. The optical pathways are arranged so as to pass through the prism. The Dove prism includes a central optical channel passing an optical wave without undergoing deviation, the axis of the channel being substantially coaxial with the reference axis of rotation. An optical pathway is furthermore arranged in the joint so as to pass through the joint, following an axis substantially coinciding with the reference axis of rotation.

7 Claims, 3 Drawing Sheets

VERY HIGH QUALITY CHANNEL FOR MULTIPATHWAY OPTICAL ROTARY JOINTS

Figure 1:
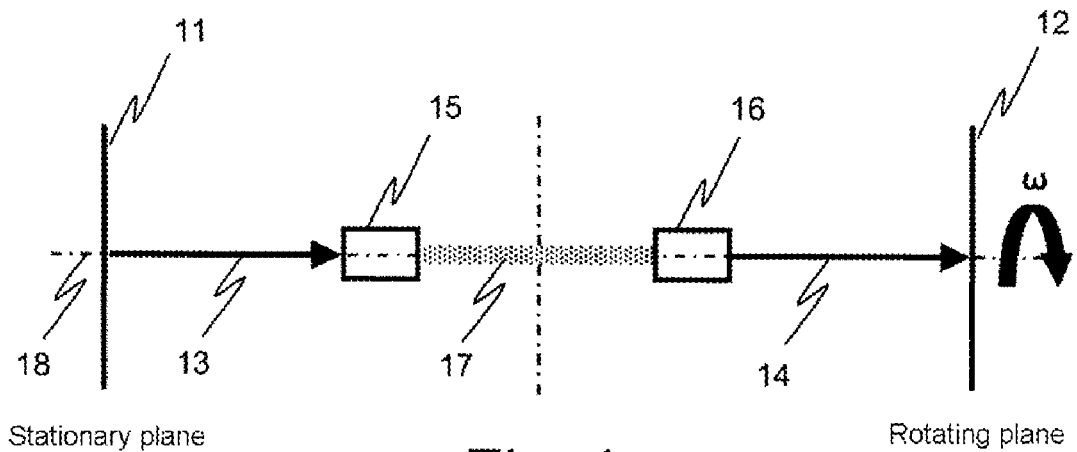

This application under 35 U.S.C. § 119 claims priority from French patent application No. 0708212 filed with the French Patent Office on Nov. 23, 2007, which is incorporated herein by reference in its entirety.

The present invention relates to the field of rotary joints, or similar devices, which make it possible, in a system comprising several sub-assemblies, to ensure the transmission of signals by physical link between a stationary sub-assembly and a piece of kit rotating about an axis. It relates notably to the fields of radar systems, drilling systems, robotized craft, which involve the transmission of signals with analogue quality level. It pertains, in addition, more specifically to optical rotary joints.

The rotary joint concept typically encompasses a vast range of devices whose physical and structural characteristics are mainly dependent on the nature of the signal transmitted. Thus, in the field of electrical and electromagnetic signals, the range of rotary joints extends from collector devices, charged with transferring electrical and power supply signals to a rotating device, to optical rotary joints, taking in UHF and microwave frequency rotary joints. Dealing as it does with radioelectric (microwave frequency in particular) and optical rotary joints, the problem to be solved consists in transmitting one or more electromagnetic waves through a transition device—the rotary joint—while causing the least possible disturbance to the signals passing through the rotary joint. The most significant disturbances consisting on the one hand of undulations in level during rotation and on the other hand of reflection phenomena (stated otherwise, mismatch) which affect the signals as they pass through the rotary joint. Among electromagnetic rotary joints, optical rotary joints have a large advantage since they enable a large number of signals to be passed on one and the same physical link (high bandwidth). They are furthermore technically simpler to produce and of smaller size than other rotary joints.

To pass several optical channels through one and the same rotary joint, two types of known solutions exist.

The first known type of solution consists in implementing a monopathway rotary joint and in resorting to wavelength multiplexing, a principle which makes it possible to transmit on one and the same single optical fibre a certain number of optical waves (carriers) whose various wavelengths follow for example a comb-like distribution, each carrier wave conveying a dedicated signal.

This first type of optical rotary joint, multichannel but monopathway, has the main drawback of adding optical losses to the link thus produced, losses which are noticeable on the whole set of transmission channels. These losses, naturally related to the insertion of an optical multiplexer and an optical demultiplexer respectively before and after the rotary joint, are dependent on the number of multiplexed pathways, the technological constraints in the production of the optical multiplexers inducing losses proportional to the numbers of channels. This is why, for applications requiring the use of a significant number of communication channels (typically greater than 16) and/or for applications involving the transmission of signals with very large dynamic swings, such a type of solution is not conceivable.

The second known type of solution consists in implementing multipathway rotary joints, and in particular rotary joints which are conventionally produced using the Dove prism. In a known manner, this type of prism, the so-called "image derotator" prism, makes it possible when it is set in rotation with a semi-rotation speed, to conjugate 2 planes that are stationary in their respective stator and rotor frames of reference. Thus, several para-axial optical channels are available. Here the expression semi-rotation speed implies a rotation speed equal to half the rotation speed of the joint as a whole.

This second type of rotary joint has, for its part, the drawback of requiring high manufacturing precision so that, despite all the care that can be taken in their production, the optical transmission pathways thus formed are nevertheless prone to fluctuations of intensity and of lengths that are inherent to the multiple reflections inside the prism during rotation as well as to defects of axiality which cause, in particular, insertion losses and phase distortions on the transported signals. These disturbances may turn out to be critical when one needs to transmit signals with analogue transmission quality, signals representing continuous quantities of large dynamic swing, such as local oscillators for example.

An aim of the invention is to propose a technical solution making it possible to transmit a plurality of signals carried by different optical pathways between a stationary item of equipment and a moving item of equipment rotating about an axis. Another aim of the invention is to propose a solution making it possible to transmit signals requiring high quality and high transmission fidelity.

For this purpose the subject of the invention is a multipathway optical rotary joint, comprising a stationary plane, a moving plane that can move about a reference axis of rotation in relation to which are positioned, on the stationary plane, the entrances of the optical pathways passing through the joint, and, on the moving plane, the exits of the same pathways. The said rotary joint also comprises a Dove prism, positioned between the stationary plane and the moving plane, rotationally mobile around itself about an axis of rotation coaxial with the reference axis of rotation. The assembly is configured so that when the moving plane rotates at a speed $\omega$, the prism rotates at a speed $\omega/2$, and arranged in such a way that the light waves carried by the optical pathways pass through the prism.

The optical rotary joint according to the invention is characterized in that the Dove prism is modified so as to comprise a central optical channel by which an optical wave passes through the crystal without undergoing deviation, the axis of the channel being coaxial with the reference axis of rotation. An optical pathway is furthermore arranged in the joint in such a way that its entry at the level of the stationary plane and its exit at the level of the moving plane occur at points substantially coinciding with the intersections of the said planes with the reference axis of rotation.

According to a particular embodiment of the invention, the central optical channel is obtained by producing a tubular conduit devoid of material passing through the prism in its entirety, coaxial with the reference axis of rotation and in which an incident light wave propagates in free space.

According to another particular embodiment of the invention, the central optical channel is obtained by producing a straightening of each of the front faces of the prism, respectively situated opposite the stationary and moving planes, around the point of intersection of this face with the reference axis of rotation, so as to form an incidence zone perpendicular to this axis, compatible in terms of surface area with the geometric extent of the optical beam transmitted, so that a light wave carried by the central optical pathway enters the prism with an incidence normal to this zone, the incident wave thus propagating in the prism without undergoing deviation.

In a variant of the previous embodiment the axial zone of each of the straightened zones receives an anti-reflection treatment, thus minimizing the optical reflections of the central channel.

According to another particular embodiment of the invention, that may be combined with the previous embodiments, the rotary joint according to the invention furthermore comprises a half-wave crystalline plate mounted rotationally mobile about an axis coaxial with the reference axis of rotation, between the stationary plane and the moving plane, and arranged in such a way that the light waves carried by the optical pathways pass through it, and that it rotates at the same speed ω/2 as the Dove prism when the rotary joint rotates at the speed ω.

In a variant of the previous embodiment the half-wave crystalline plate is placed between the stationary plane and the prism.

In another variant of the previous embodiment the half-wave crystalline plate is placed between the prism and the moving plane.

Figure 2:
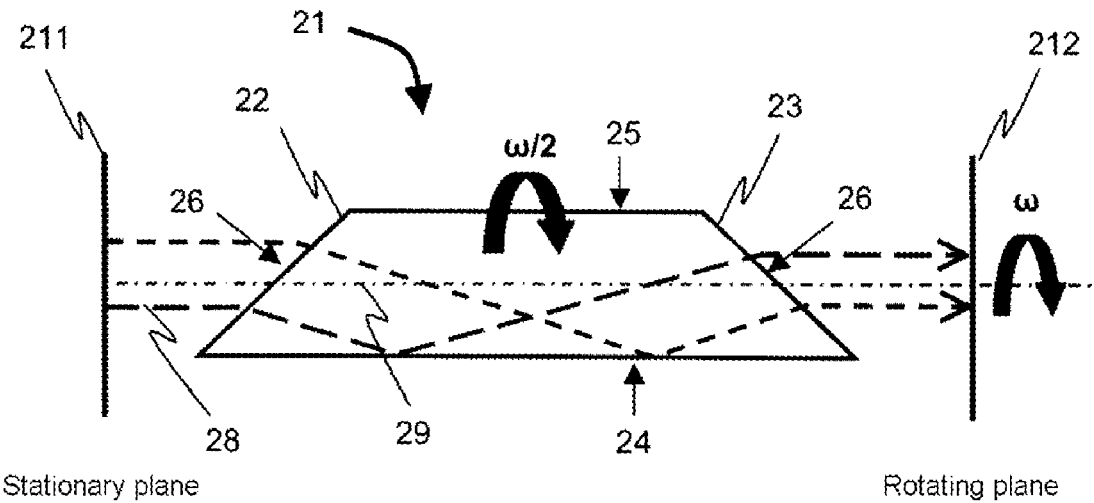
Figure 3:
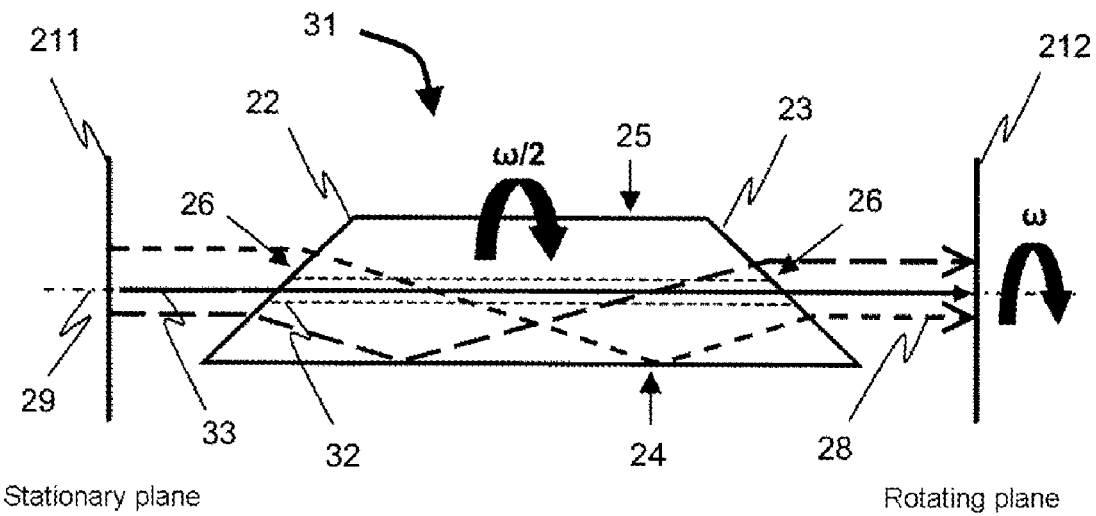

The characteristics and advantages of the invention will be better appreciated by virtue of the description which follows, which description sets forth the invention through a particular embodiment taken as nonlimiting example and which is based on the appended figures, which figures represent:

FIG. 1, the schematic structure of a simple optical rotary joint;

FIG. 2, the schematic structure of a multipathway optical rotary joint comprising an image rotator device of Dove prism type;

FIG. 3, the schematic structure of the multipathway optical rotary joint according to the invention.

Figure 4:
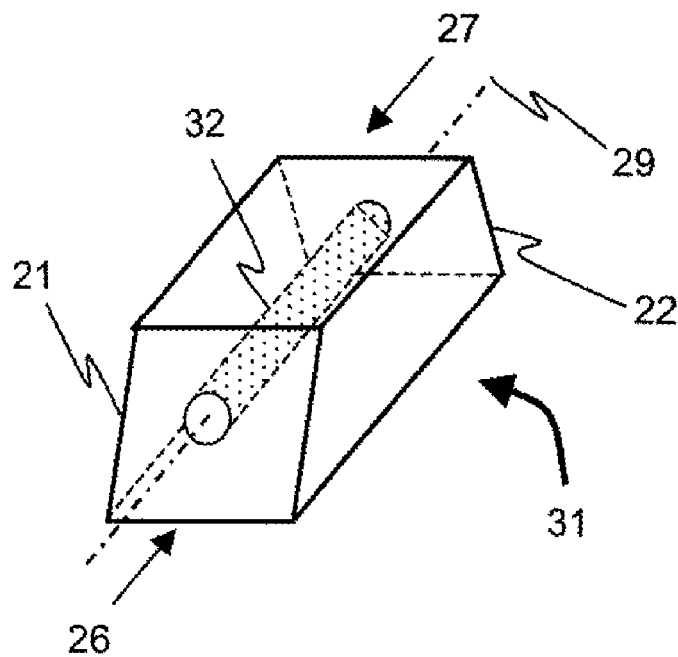
Figure 5:
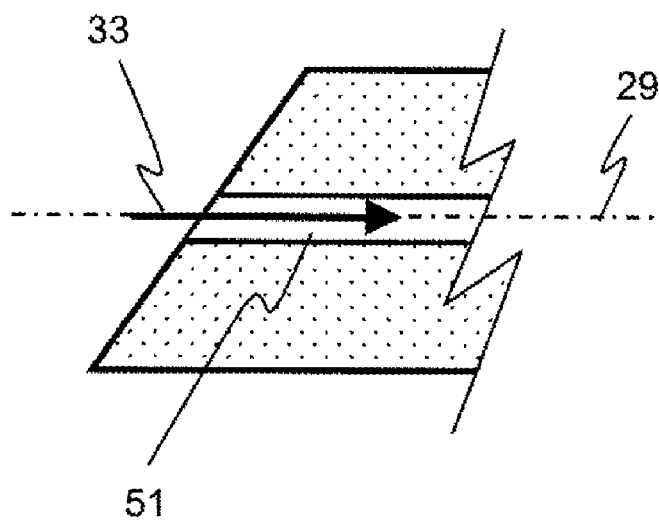

FIGS. 4 and 5, schematic representations of the embodiment of the Dove prism implemented in the optical rotary joint according to the invention.

FIGS. 6 to 9, schematic illustrations relating to variant embodiments of the optical rotary joint according to the invention.

FIGS. 1 and 2, which present two known types of optical rotary joints, are considered first.

FIG. 1 schematically presents the structure of a simple, monopathway, optical rotary joint. Like any rotary joint, it comprises a stationary part or stator 11 forming a stationary reference plane onto which the optical pathway bringing the light wave up to the entrance of the rotary joint emerges. It also comprises a moving part or rotor 12 rotating about an axis 18. A current embodiment of such an optical rotary joint consists in placing the ends of two optical fibres 13 and 14 precisely opposite one another by means of collimation devices 15 and 16, the assembly being arranged in a precision roller bearing (not represented in the figure) in such a way that the collimated beam 17 arising from the fibre 13 of the stator is picked up by the collimation device for the fibre 14 of the rotor. The transmission of the light wave from the stator to the rotor thus occurs in free space so that a minimal alteration in the amplitude or phase of the signal carried by the light wave is produced. It is therefore possible to transmit, between the stator and the rotor, signals whose transmission requires the existence of a transmission channel of very good quality (one speaks in this regard of "analogue" quality). Such is the case for example if one desires to transmit signals constituting time references, more generally phase references, through the rotary joint. On the other hand, as was stated previously, such a device allows the transmission of a single pathway only, so that the transmission of several signals may only be performed by employing multiplexing, wavelength multiplexing in this instance. Now, the number of wavelengths that can be multiplexed being limited, in particular by the capacity of the optical fibres, the number of signals that can be transmitted through a rotary joint such as this is also limited to a few signals.

FIG. 2 schematically presents a type of multipathway optical rotary joint of known structure, whose structure is based on the use of a Dove prism. It is recalled here that the Dove prism is a known optical device 21, a right prism, whose bases are trapeziums whose sides 22 and 23 stand on two perpendicular straight lines. This prism thus comprises two parallel rectangular faces 24 and 25 and two faces 26 and 27, front faces, which exhibit an angle of 90° between them.

As illustrated by FIG. 2, this prism is mainly characterized, in a known manner, by the fact that a beam 28, entering the prism in an incident manner through one of the front faces 26 or 27 and parallel to the axis 29 passing through the centres of these two front faces, is deviated inside the prism towards the surface of the face 24 on which it is totally reflected so as ultimately to emerge from the prism through the opposite front face in a direction parallel to its direction of entry. In this way the incident beam undergoes, between the entrance and the exit of the prism, a translation of constant value. The sense of the translation is additionally given by the position occupied by the point of incidence of the beam on the front entry face 26 or 27, with respect to the plane of reflection materialized by the face 24. In a likewise known manner, the Dove prism is further characterized by the fact that having regard to its geometric characteristics, if it is set in rotation, from a rest position such as that illustrated by FIG. 2, about the axis 29 passing through the centres of the two front faces 25 and 26, the beam 27 undergoes a translation that varies in a periodic manner, the translation being identical to the translation initially undergone by the beam each time that the prism has performed a rotation by an angle equal to kπ with respect to its initial position.

Accordingly it is known to exploit these technical characteristics in order to produce a multipathway optical rotary joint. The corresponding device is produced by arranging a stator exhibiting a stationary plane onto which emerge, at stationary points, the physical pathways (optical fibres for example) conveying the light beams to be transmitted with a rotor consisting of a rotationally mobile plane 212, on which emerge the physical pathways conveying the light beams exiting the rotary joint. The two planes are additionally parallel and the arrangement of the relative positions of the points at which the luminous entrance pathways emerge at the level of the stationary plane 211 of the stator is identical to that of the points at which the luminous exit pathways emerge at the level of the moving plane 212 of the rotor. They are furthermore arranged one with respect to the other so as to create a free space between them and in such a way that the rotationally mobile plane 212 can assume an orientation such that each beam exit point of the rotating plane 212 is placed facing a beam entry point of the Stationary plane 211. A moving Dove prism rotationally mobile about the axis 29 joining the middles of the two front faces 26 and 27 is placed in the space created between the two planes. It is arranged in such a way that the parallel faces 24 and 25 are perpendicular to the planes 211 and 212 and that the axis of rotation 28 coincides with the axis of rotation of the rotating plane 212. Furthermore it rotates integrally with this plane, by means of a scaledown element which gives rise to a rotation of the prism at a speed equal to ω/2, when the stator is rotating at a given speed ω. A device in which there exists a permanent one-to-one connection between an entry point of the rotary joint and an exit point is thus obtained, whatever the relative orientation at the instant considered of the stationary plane, that is to say of the stator, and of the moving plane, that is to say of the rotor.

As was stated previously, such a device advantageously allows multipathway transmission, the number of optical pathways that can be conveyed by such a device being naturally dependent on the size of the prism used: the entry and exit points having to be arranged in those zones of the stationary 211 and rotating 212 planes that are situated opposite the front faces 26 and 27 of the prism so that each of the transmitted beams is able to enter it. However on account of the necessary manufacturing tolerances, in particular of the alignment tolerances for the various axes, it is difficult and above all very expensive to produce an optical joint allowing the transmission of the various optical pathways with sufficient quality to ensure signal transmission without amplitude or phase alteration. In particular, this production quality limitation does not make it possible, unless very particular care is taken over the production of the rotary joint, to transmit reference signals such as local oscillators for example.

FIGS. 3 and 4 which schematically illustrate the operating principle of the device according to the invention are now considered.

The multipathway optical rotary joint according to the invention borrows the structure of a conventional Dove prism multipathway optical joint, such as described previously. It therefore conventionally comprises, as illustrated in a schematic manner by FIG. 3, a given number of optical pathways whose access points at entry and at entry exit are arranged, as described previously, around the axis of rotation of the Dove prism. However, the Dove prism used here is a modified prism 31 such that a particular optical channel 32 in which an incident light beam 33 is transmitted through the prism without undergoing deviation is created around the axis of rotation 29. This optical channel 32 being furthermore coaxial with the axis of rotation of the prism, its position, in relation to the stationary plane 211 and to the moving plane 212, remains invariant when the rotor is rotating. In this way, the beam incident on this particular channel advantageously undergoes no spurious variation in its amplitude or in its phase variations notably related to the reflections of the beam in the prism and to the variations in optical path length which are related to the rotation of the prism around itself. The prism thus produced exhibits a general structure such as that illustrated schematically by FIG. 4.

One thus advantageously obtains a multipathway optical rotary joint exhibiting a plurality of optical pathways of standard quality, which are disposed around the axis of rotation 29 in such a way that the light waves following these optical pathways pass through the prism, and an optical pathway of analogue quality in which one or more light waves can be transmitted without amplitude or phase alteration. This device is obtained by virtue of the use of a Dove prism, modified so as to form a central channel in which an incident wave does not undergo any deviation, the prism 31 being and arranged between the planes 211 and 212 in such a way that the elements of the joint 31 and 212, which are rotationally mobile, have one and the same axis of rotation 29 coaxial with the axis of the channel.

From a practical point of view the Dove prism thus modified can be produced from a conventional Dove prism in various ways. Two preferred embodiments are illustrated by FIGS. 5 and 6.

In the embodiment of FIG. 5, the Dove prism is modified so as to produce an excavation forming a tubular channel 51 of circular cross section concentric with the axis of rotation 29 of the prism, in the material constituting the prism. The channel thus produced allows the rectilinear propagation of the incident beam 33 in a medium consisting of air, which has the advantage of not causing any attenuation of the beam thus transmitted. On the other hand the production of such a channel renders the machining of the prism more complex, the channel having to be produced without altering the optical properties of the prism.

Figure 6:
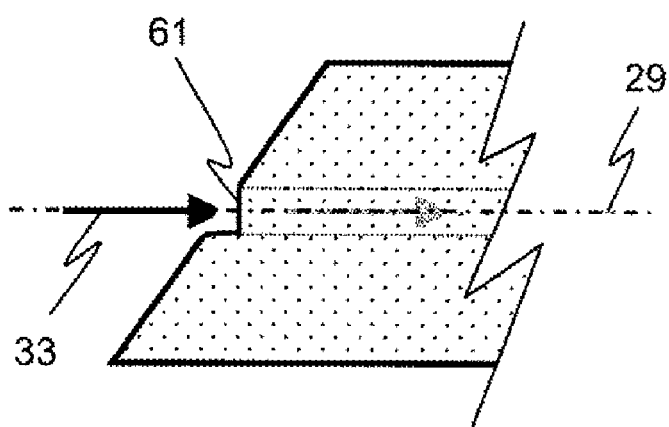

The embodiment of FIG. 6, corresponds to a simpler modification of the conventional Dove prism. This modification consists in locally straightening the front faces 26 and 27, so as to form a surface area of circular cross section 61 for example, perpendicular to the axis of rotation 29 of the prism and centred on its intersection with this axis; the diameter of this surface area corresponding to the diameter of the channel to be produced. A zone 61 in which an incident beam 32, parallel to the axis 29, passes through the front face without undergoing deviation, the angle of incidence being zero, is thus formed on the surface of the prism. Everything then happens as if the beam 32 were passing through a virtual channel 62.

This embodiment, advantageously simpler than the previous, has the drawback however of compelling the incident beam to pass through the material constituting the prism, this passing through being accompanied by a partial reflection of the signal on the right diopter. This reflection can advantageously be diminished by depositing an anti-reflection treatment on the surface 61.

Figure 7:
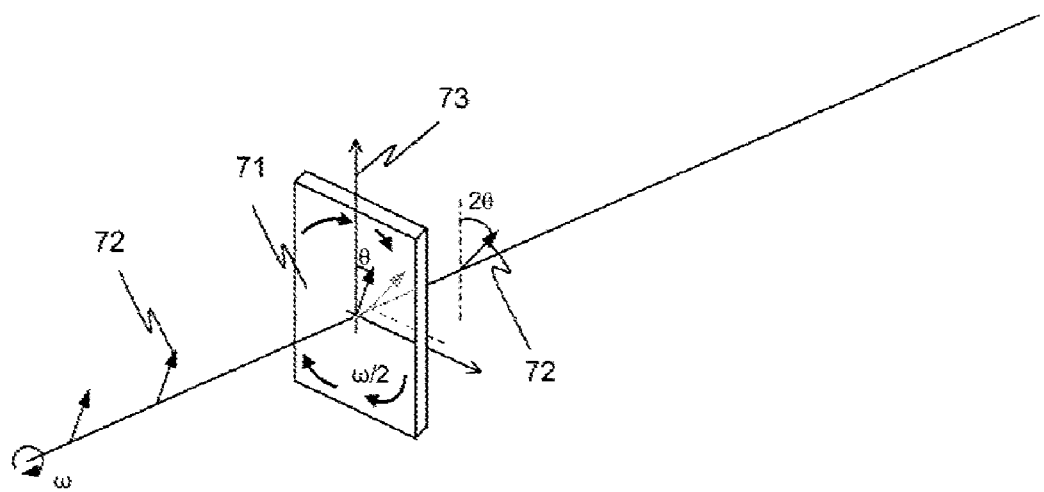
Figure 8:
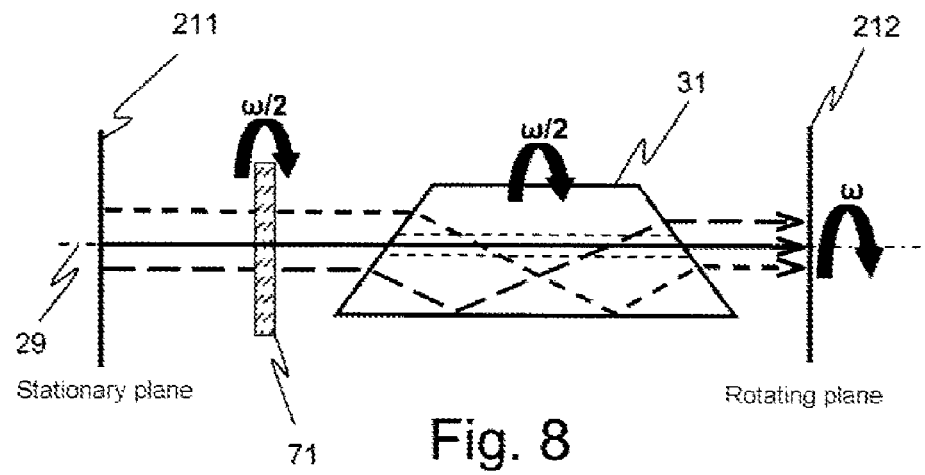
Figure 9:
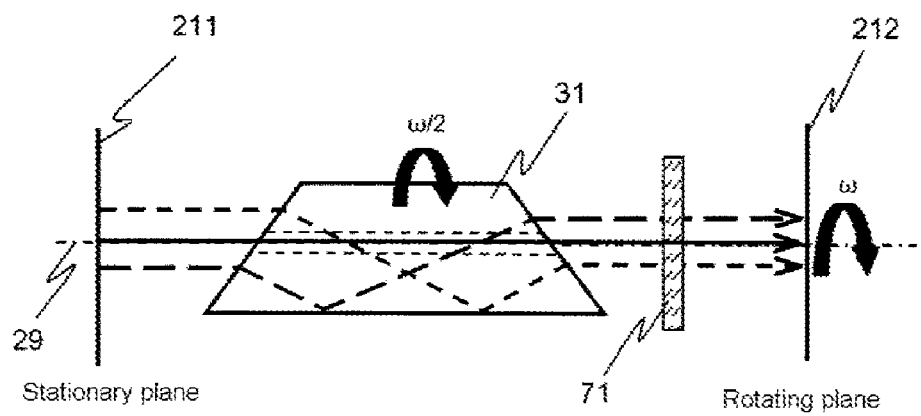

FIGS. 7 to 9, which present in a schematic manner a variant embodiment of the device according to the invention, are now considered. In this variant embodiment the rotary joint according to the invention comprises in addition to a modified Dove prism, with a central channel, a half-wave crystalline plate rotationally integral with the prism. The assembly is arranged in such a way that, when the rotor of the joint rotates at a speed $\omega$, the prism and the half-wave plate rotate at a speed $\omega/2$.

In a known manner, as illustrated by FIG. 7, a half-wave crystalline plate 71 has the property of modifying the direction of polarization of the polarized waves. Thus a linearly polarized light wave 72, entering a half-wave plate 71 at normal incidence and exhibiting a direction of polarization making an angle $\theta$ with one of the principal axes of propagation of the plate, the ordinary axis 73 for example, will undergo, as it passes through, a deviation of its direction of polarization equal to $2\theta$.

Accordingly if, as in the case of this variant of the device according to the invention, the half-wave plate is moving in rotation at a speed $\omega/2$, the deviation of the direction of the incident wave will be equal to $2\theta+\omega t$. Hence, if this wave is collected by a sensor whose polarization axis rotates, for its part, at the speed $\omega$, the orientation of the polarization axis of the incident wave with respect to the polarization axis of the sensor remains unchanged. Such is advantageously the case for the rotary joint according to the invention for which the sensor in question, an optical fibre for example, is positioned at the level of the rotor which rotates at the speed $\omega$. A multipathway optical rotary joint is thus obtained which allows faithful transmission of polarized waves, linearly polarized notably.

FIGS. 8 and 9 present two concrete examples of possible arrangements of the various elements in respect of this variant of the rotary joint according to the invention. FIG. 8 presents an arrangement according to which the half-wave crystalline plate is positioned at the head, between the stationary plane 211 (stator) and the modified Dove prism 31. FIG. 9, for its part, presents an alternative arrangement according to which the half-wave crystalline plate is positioned between the prism 31 and the rotating plane 212 (rotor).

The invention claimed is:

1. A multipathway optical rotary joint, having a stationary reference plane and a moving reference plane rotatable about a reference axis of rotation, comprising:
   a Dove prism, positioned between the stationary reference plane and the moving reference plane, the Dove prism comprising:
   a first front face facing the stationary reference plane;
   a second front face facing the moving reference plane;
   the Dove prism having a prism axis of rotation substantially coaxial with the reference axis of rotation, so that when the moving reference plane rotates at a speed $\omega$, the prism rotates at a speed $\omega/2$; and
   a central optical channel positioned such that an axis of the central optical channel is substantially coaxial with the reference axis of rotation,
   wherein the central optical channel is configured to form an optical pathway from a point substantially corresponding to the intersection of the reference axis of rotation with the stationary reference plane, through the central optical channel, to a point substantially corresponding to the intersection of the reference axis of rotation with the moving reference plane, such that an optical wave passes through the Dove prism without undergoing deviation.

2. The rotary joint according to claim 1, wherein the central optical channel includes a tubular conduit devoid of material passing through the Dove prism in its entirety, coaxial with the reference axis of rotation and in which an incident light wave propagates in free space.

3. The rotary joint according to claim 1, wherein the central optical channel includes a straightening of the first front face and the second front face of the Dove prism, around the point of intersection of each face with the reference axis of rotation, so as to form an incidence zone perpendicular to this axis, compatible in terms of surface area with the geometric extent of the optical beam transmitted, so that a light wave carried by the central optical pathway enters the Dove prism with an incidence normal to this zone, the incident wave thus propagating in the Dove prism without undergoing deviation.

4. The rotary joint according to claim 3 wherein each of the incidence zones receives an anti-reflection treatment, thus minimizing the optical reflections of the central channel.

5. The rotary joint according to claim 1, further comprising a half-wave crystalline plate rotatable about an axis substantially coaxial with the reference axis of rotation, between the stationary reference plane and the moving reference plane, and arranged in such a way that the light waves carried by the optical pathways pass through it; the half-wave crystalline plate rotating at the same speed $\omega/2$ as the Dove prism when the reference plane rotates at the speed $\omega$.

6. The rotary joint according to claim 5, wherein the half-wave crystalline plate is placed between the stationary plane and the Dove prism.

7. The rotary joint according to claim 5, wherein the half-wave crystalline plate is placed between the Dove prism and the moving plane.

* * * * *